United States Patent
Shen et al.

(10) Patent No.: US 7,158,356 B2
(45) Date of Patent: Jan. 2, 2007

(54) ELIMINATION OF ELECTRIC-POP NOISE IN A MR DEVICE

(75) Inventors: Yong Shen, Tai Po (HK); Kwok Kam Leung, Yuen Long (HK); Hiroshi Kiyono, Saku (JP); Tetsuo Miyazaki, Nagano (JP)

(73) Assignee: Sae Magnetics (HK) Ltd., Hong Kong (HK)

( * ) Notice: Subject to any disclaimer, the term of this patent is extended or adjusted under 35 U.S.C. 154(b) by 0 days.

(21) Appl. No.: 10/792,078

(22) Filed: Mar. 3, 2004

(65) Prior Publication Data

US 2004/0169966 A1 Sep. 2, 2004

Related U.S. Application Data

(62) Division of application No. 10/317,878, filed on Dec. 12, 2002, which is a division of application No. 09/265,083, filed on Mar. 9, 1999, now Pat. No. 6,583,971.

(51) Int. Cl.
*G11B 5/39* (2006.01)

(52) U.S. Cl. .............................. 360/327.22; 360/327.24

(58) Field of Classification Search ............ 360/327.22, 360/323, 327.3, 327.33, 322, 327.24, 327.1; 338/32 R; 324/207.21, 252
See application file for complete search history.

(56) References Cited

U.S. PATENT DOCUMENTS

| | | | |
|---|---|---|---|
| 3,864,751 A | 2/1975 | Beaulieu et al. | |
| 4,639,806 A | 1/1987 | Kira et al. | |
| 4,663,685 A | 5/1987 | Tsang | |
| 5,018,037 A | 5/1991 | Krounbi et al. | |
| 5,247,413 A * | 9/1993 | Shibata et al. | 360/319 |
| 5,285,339 A * | 2/1994 | Chen et al. | 360/327.1 |
| 5,438,470 A * | 8/1995 | Ravipati et al. | 360/322 |
| 5,442,507 A * | 8/1995 | Koga et al. | 360/322 |
| 5,483,402 A * | 1/1996 | Batra | 360/322 |
| 5,557,492 A * | 9/1996 | Gill et al. | 360/319 |
| 5,715,120 A * | 2/1998 | Gill | 360/327.22 |
| 5,739,990 A * | 4/1998 | Ravipati et al. | 360/324.12 |
| 5,761,010 A * | 6/1998 | Mimura | 360/327.32 |
| 5,800,935 A * | 9/1998 | Ishi | 428/692 |
| 5,828,526 A * | 10/1998 | Kagawa et al. | 360/324 |
| 5,883,764 A * | 3/1999 | Pinarbasi | 360/322 |
| 5,949,623 A * | 9/1999 | Lin | 360/324.12 |
| 5,966,272 A * | 10/1999 | Cain | 360/327.22 |
| 6,091,589 A * | 7/2000 | Han et al. | 360/327.22 |
| 6,111,730 A * | 8/2000 | Fernandez-de-Castro | 360/327.1 |
| 6,137,663 A * | 10/2000 | Kurashina | 360/327.32 |
| 6,583,971 B1 * | 6/2003 | Shen et al. | 360/327.22 |

* cited by examiner

*Primary Examiner*—Brian E. Miller
(74) *Attorney, Agent, or Firm*—Jenkens & Gilchrist, P.C.

(57) ABSTRACT

The invention relates to a magnetic recording head comprising: a bottom shield; a top shield; and AMR device with MR and SAL separated by a thin insulating layer; a first insulting gap layer between said bottom shield and said AMR; a second insulating gap layer between said AMR and said top shield; a conductive layer contact at one end region of said MR and SAL. Furthermore, magnetic recording heads with GMR device free of electric-pop noise also are disclosed.

5 Claims, 6 Drawing Sheets

ELIMINATION OF ELECTRIC-POP NOISE
IN A MR DEVICE

CROSS REFERENCE TO RELATED
APPLICATIONS

This application is a divisional application of U.S. patent application Ser. No. 10/317,878, filed on Dec. 12, 2002, which is a divisional application of U.S. patent application Ser. No. 09/265,083, filed on Mar. 9, 1999, now issued as U.S. Pat. No. 6,583,971, and is incorporated by reference herein in its entirety.

BACKGROUND OF THE INVENTION

1. Field of the Invention

The present invention generally relates to an active device capable of converting an electrical signal into a voltage, more specifically, to a magnetic recording head consisting of either an anisotropic magneto-resistive (hereinafter referred as AMR) or giant magneto-resistive (hereafter referred as GMR) sensor along with an insulation spacer and magnetic shields.

2. Description of the Related Art

As is well known in the field, the insulating spacer in AMR/GMR recording heads is becoming thinner and thinner in order to increase a linear recording density. Inevitably, we are facing electric-pop noise resulting from the thinner spacer. For high manufacturing yield and reliability of electric and magnetic performance, such electric-pop noise must be eliminated.

U.S. Pat. No. 3,864,751 entitled "Induced Bias Magnetoresistive Read Transducer" issued to Beaulier and Napela, on Feb. 4, 1975 proposed that a soft-adjacent magnetic transverse bias layer (hereinafter referred to as "SAL") is isolated from a magneto-resistive device (referred to as MR hereinafter). The patent did not reveal any methods how to make it. Another key point is that the MR and SAL are electrically isolated. In the prior art described by Beaulieu et al., electric-pop noise is present if a thinner insulating spacer (<150 Å), such as $Al_2O_3$, is used. Otherwise, the devices would need a thicker SAL to bias the MR if a thicker insulator spacer (2–400 Å) were used. There are two problems associated with the latter case. Firstly, the SAL can not be easily saturated by a current in the MR and an antiferromagnetic pinning layer must be used to pin the SAL so that the SAL magnetization is perpendicular to the current direction. In this case, the device process becomes very complicated and it also renders designs less extendible to a narrower shield to shield spacing for higher density recording.

The SAL has a function as a shunt bias layer in SAL biased AMR devices. When the MR and SAL are spaced by electric conducting materials, such as Ta, the SAL and MR devices have the same electric track width. These 15 configurations have been disclosed in U.S. Pat. No. 4,663,685 issued in 1987, to C. Tsang, U.S. Pat. No. 4,639,806 issued in 1987 to T. Kira, T. Miyagachi, and U.S. Pat. No. 5,018,037 issued to M. Yoshikawa, M. T. Krounbi, O. Voegeli and P. Wang.

SUMMARY OF THE INVENTION

Accordingly, one objective of this invention is to provide an AMR design with a thin insulating spacer free of electric-pop noise.

Another objective is to provide a SAL biased AMR product using an insulated spacer.

A further objective of this invention is to provide an electric active device free of electric-pop noise over an insulating spacer on the top of an electric conductor.

Still another objective of this invention is to provide a design to eliminate electric-pop noise in GMR magnetic recording heads with a thin insulating spacer.

In accordance with one aspect of the present invention, a magnetic recording device comprising:
  an anisotropic magnetoresistive (MR) sensing layer;
  a soft-adjacent magnetic transverse bias layer (SAL);
  an insulating layer arranged between said magnetoresistive layer and said magnetic transverse bias layer;
  a conductive layer contacting electronically both said magnetosensitive layer and said magnetic bias layer at at least one end region of said SAL element.

In accordance with another aspect of the present invention, a magnetic recording device comprising:
  a first shield;
  a second shield;
  a GMR device;
  a first insulating gap layer between said GMR and one of said shields;
  a second insulating gap layer between said GMR and another of said two shields;
  a conductive layer contacting electrically said GMR device to either one of said shields.

In accordance with one aspect of the present invention, a magnetoresistive device comprising:
  a magnetosresistive layer;
  a soft-adjacent magnetic transverse bias layer (SAL);
  an insulating layer arranged between said magnetosresistive layer and said magnetic transverse bias layer;
  a conductive layer contacting electrically both said magnetosresistive layer and 15 said magnetic bias layer at at least one end region of said SAL element.

In accordance with a further aspect of the present invention, a hard disk driver is provided with the magnetoresistive device.

Compared to the prior art by Tsang, Kire et al and Kroumbi et al, this invention provides an AMR sensor with much improved signal. The signal improvement can be as much as 90% provided that the same MR/SAL device and operating current are used for the device.

Other objects, features and advantages of the present invention will become readily apparent from the following description taken in conjunction with the accompanying drawings.

BRIEF DESCRIPTION OF DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1b is a cross-section view taken along line AA indicated in FIG. 1a,

DETAILED DESCRIPTION OF PREFERRED EMBODIMENTS

Embodiments according to the present invention will be described in the following.

Figure 1A:
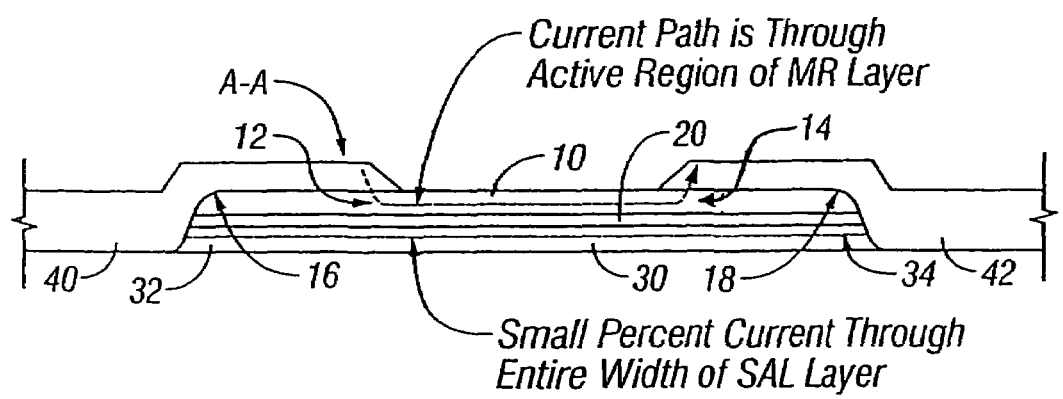
FIG. 1a is a diagram of a preferred embodiment of the invention.

FIG. 1a is a diagram of a first preferred embodiment of the invention. As shown in this figure, MR layer 10 and SAL 30 are separated by a thin insulated spacer layer 20, and are electrically connected at the ends of the MR element. An active region 10 of the MR device could be either a NiFe film or a composite layer, such as TaN/NiFe/TaN. NiFe, thickness ranges from 50 to 400 Å. Side regions 12 and 14 of the MR element make electric contact with longitudinal bias layer and lead layer stacks 40 and 42. End regions 16 and 18 of the MR element are connected to the end regions 32, 34 of SAL by the lead and longitudinal bias layer stacks 40 and 42. The length of MR element and SAL ranges from 2 to 20 μm. Insulating spacing layer 20 is made of insulating materials, such as $Al_2O_3$, AlON and $SiO_2$, and the typical thickness of insulating spacing layer varies from 50 to 200 Å. Soft-adjacent layer (SAL) 30 can be made of NiFe, NiFeCr, NiFeRh. The moment ratio of SAL 30 to MR layer 10 ranges from 0.6 to 1.0.

In FIG. 1a, longitudinal bias layer can be made of anti-ferromagnetic materials, such as NiMn, FeMn, PtPdMn, IrMn and PtMn. Lead layer can be made of Ta, W or Ta/Au/Ta. Longitudinal bias layer and lead layer extend coverage on top of the MR element 10 and electrically contact with MR element 10 through side regions 12 and 14, respectively. Therefore, the electric track width of the MR element is defined by active region 10 as longitudinal bias layer and lead layer have much higher electric conductivity than the MR layer.

On the other hand, longitudinal bias layer and lead layer electrically contact with SAL layer 30 through side surfaces 32 and 34, respectively. Therefore, the electric track width of the SAL element is the entire element width.

Figure 1B:
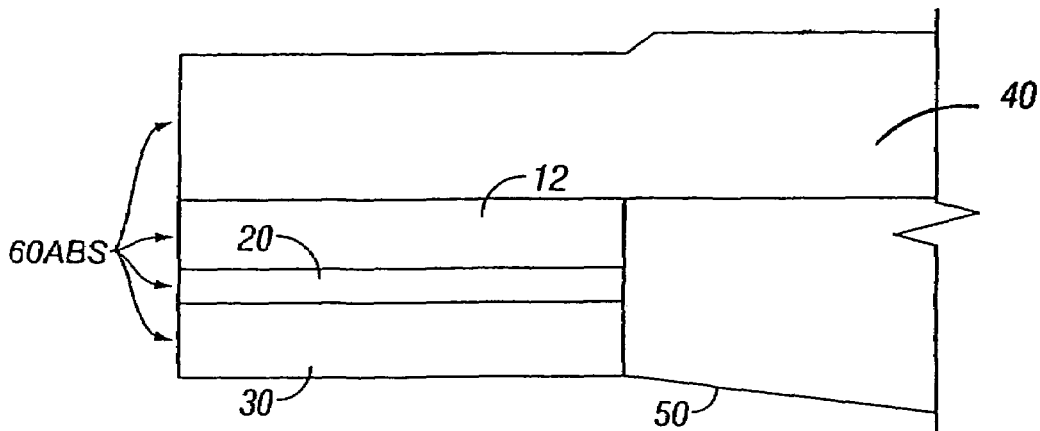

Now refer to FIG. 1b that shows cross-section view taken along line AA indicated in FIG. 1a. Function of insulator film 50 is to prevent electric connection from MR 10 to SAL 30. Numeral 60 designates an air bearing surface (ABS).

Figure 2:
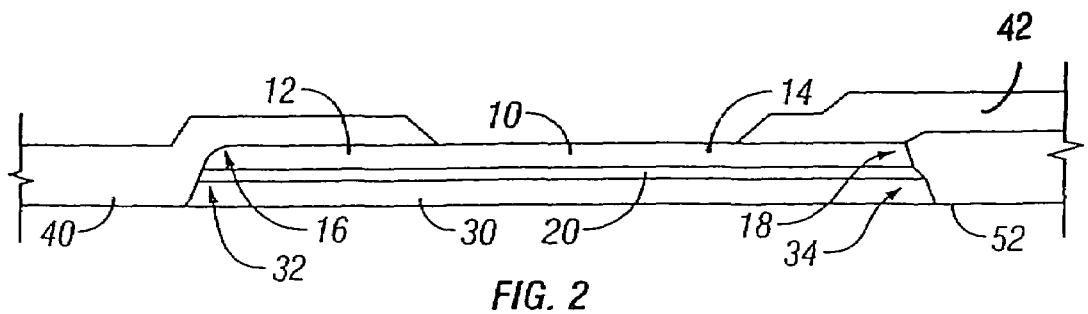
FIG. 2 is a diagram of an alternative embodiment of the invention.

In the following drawings, similar parts to those in FIG. 1 are designated by the same numerals as those used in FIG. 1. FIG. 2 shows an alternative embodiment of the present invention. MR layer 10 and SAL 30 are separated by a thin insulating spacer layer 20. MR layer 10 and SAL 30 are electrically connected at only one end region of the MR element. In this embodiment, no electric current passes through the SAL element. However, the whole SAL element is in an equal electric potential to that of one side of the MR element. One side region of the longitudinal bias layer and the lead layer does not electrically contact with a corresponding SAL end region. Insulator film 52 are electrically connected between MR layer 10 and SAL 30 at one end of the device.

FIG. 3 shows test results of the electric-pop noise before and after connection of MR layer 10 and SAL 30 under test conditions: trigger level=75 μV, threshold level=(Noise amplitude of Is=5 mA)+60 μV, and read current=12 mA.

Figure 3A:
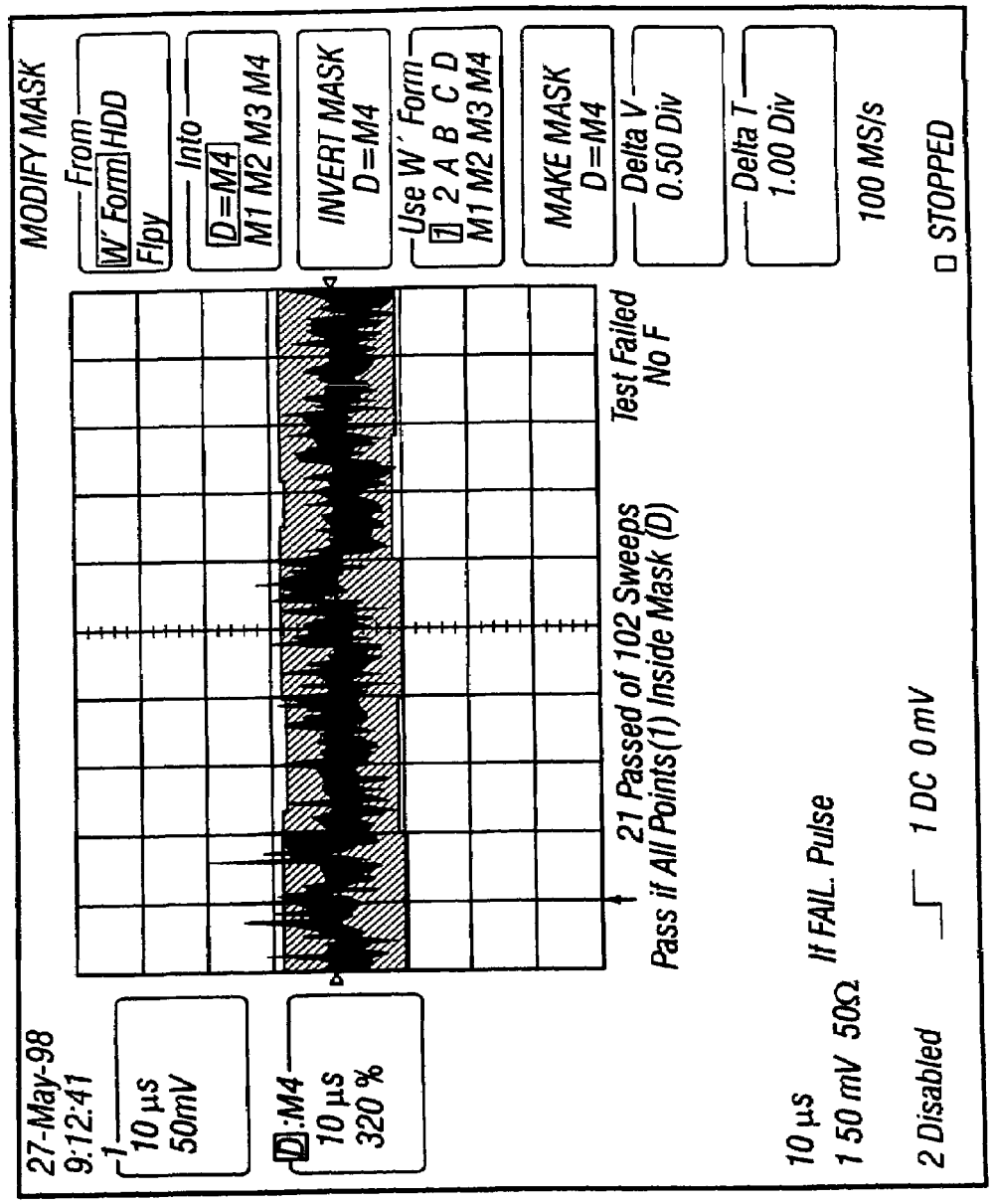
FIGS. 3a–3d show electric-pop test results before and after MR and SAL are connected by microfabrication.
Figure 3B:
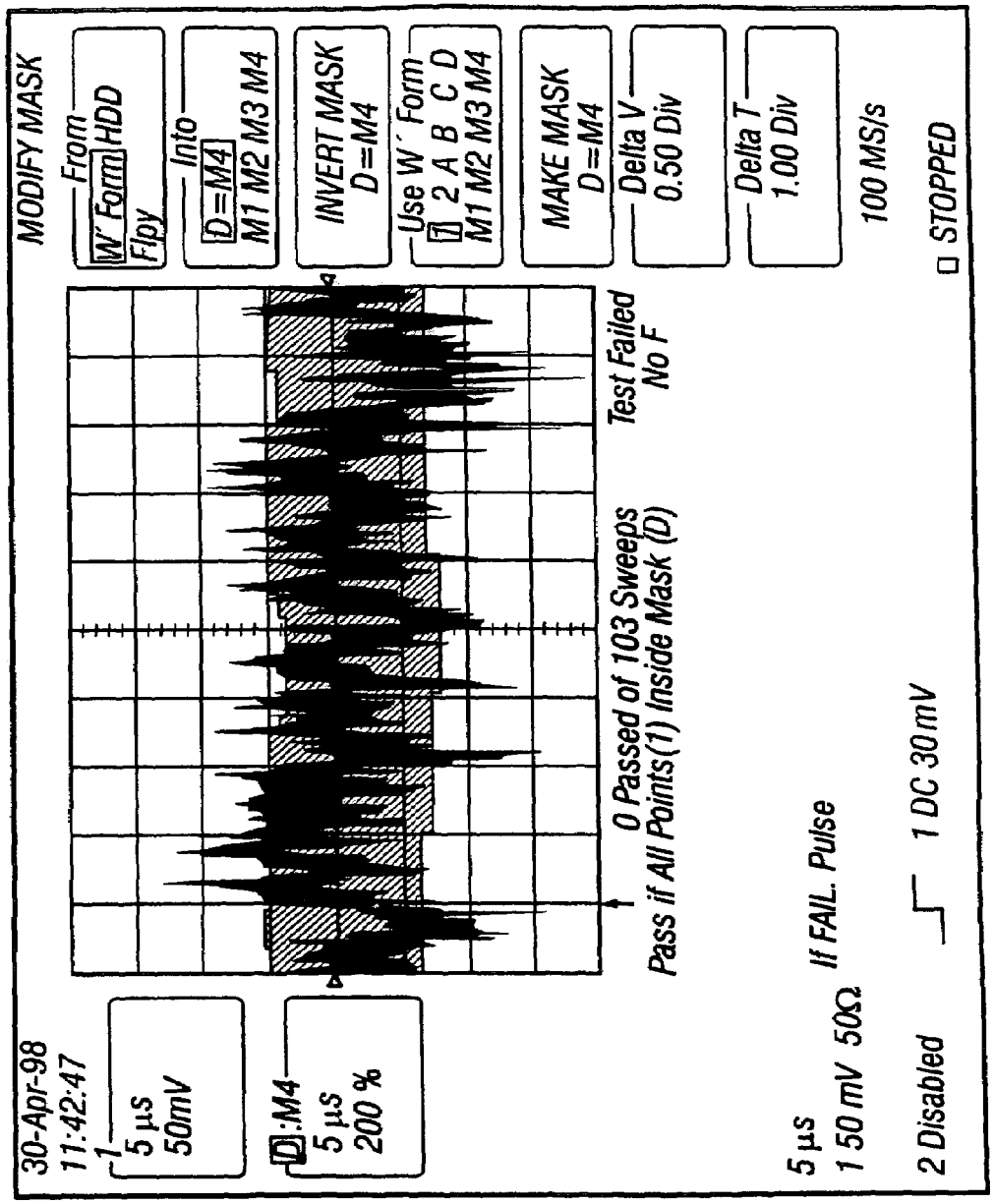
Figure 3C:
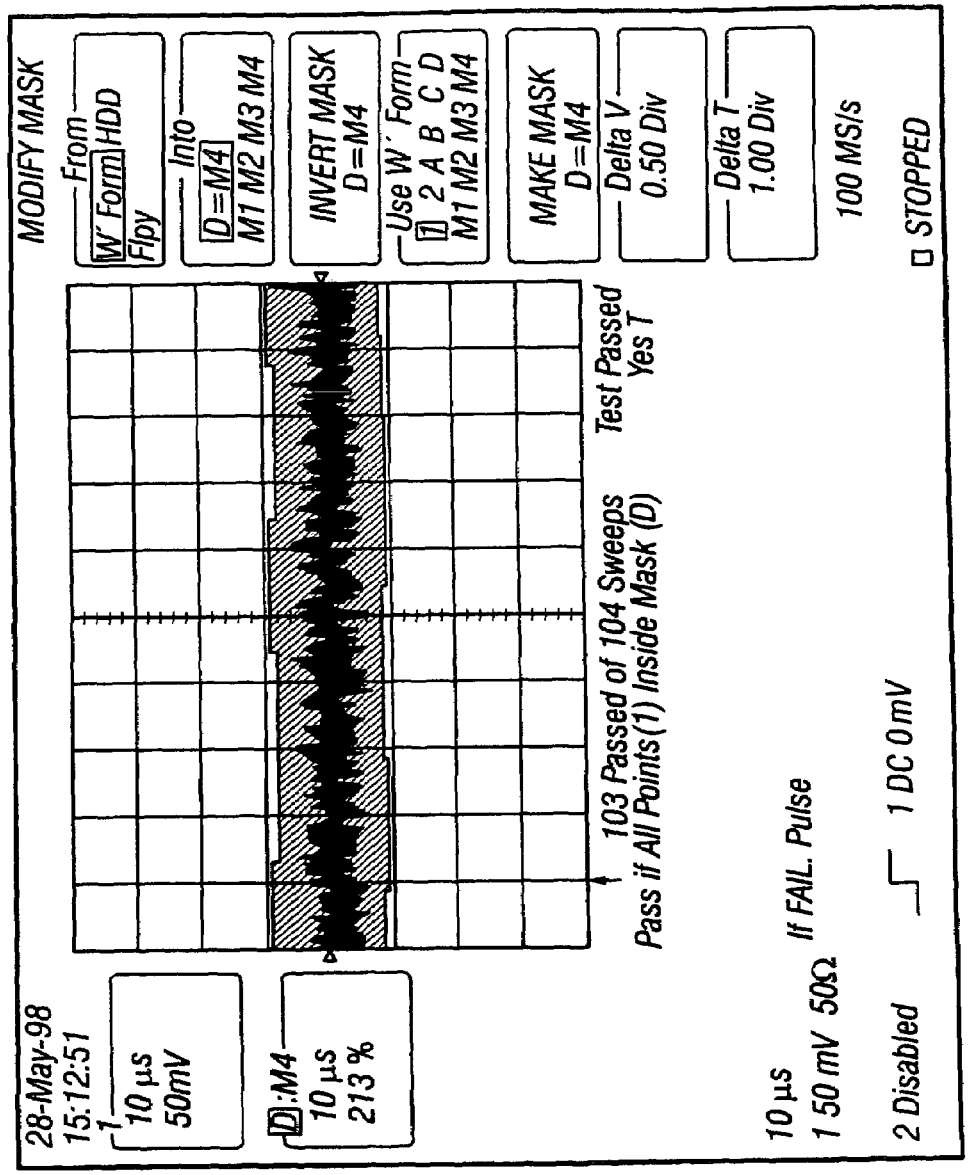
Figure 3D:
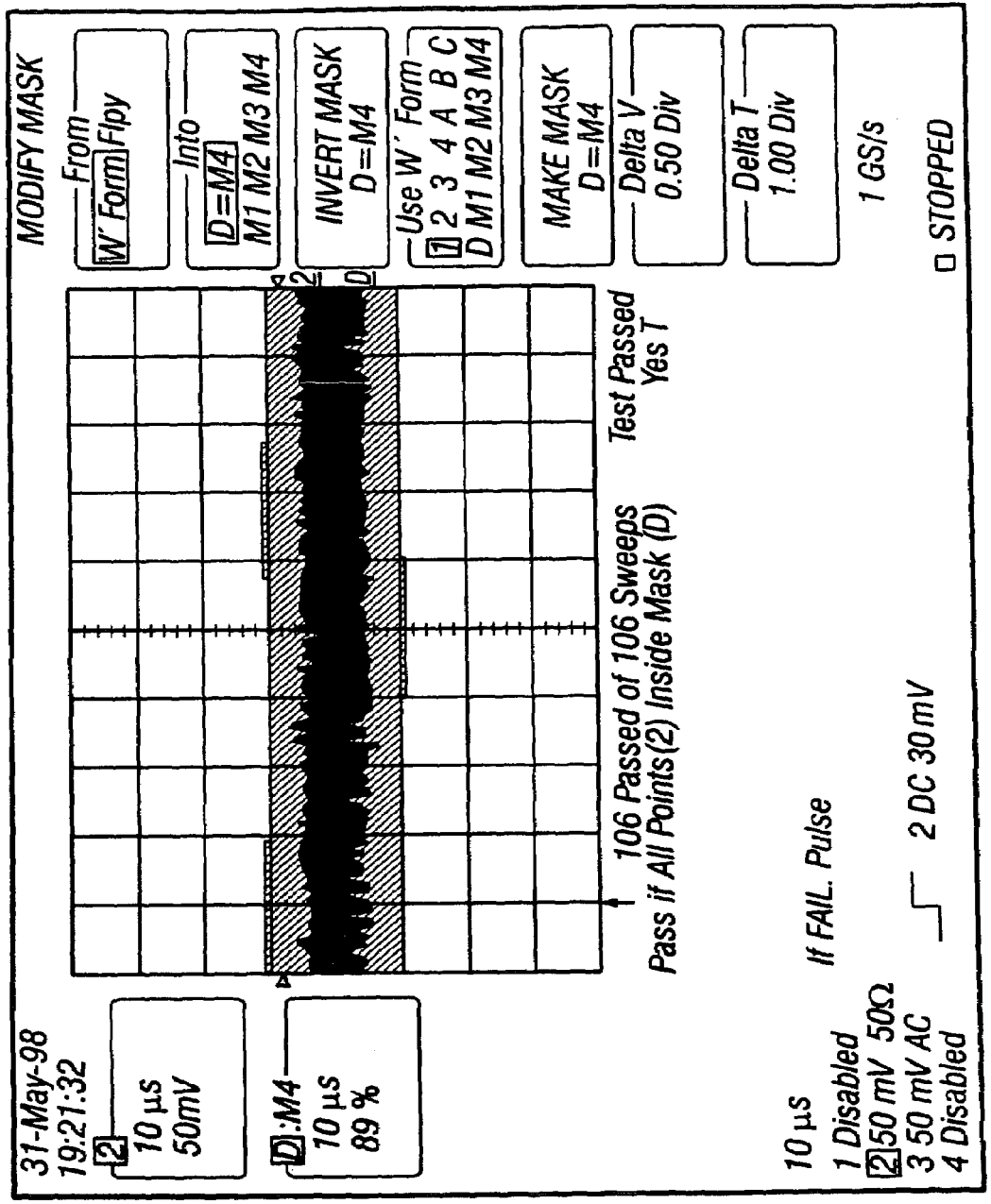

FIGS. 3a and 3b show electric-pop noise spectra of the device before edge shorting of the MR and SAL element, and FIGS. 3c and 3d show the same of the device after edge shorting of the MR and SAL element.

FIG. 4 shows an extension to prevent a GMR device from electric-pop noise due to discharge between the GMR device and shields.

Figure 4A:
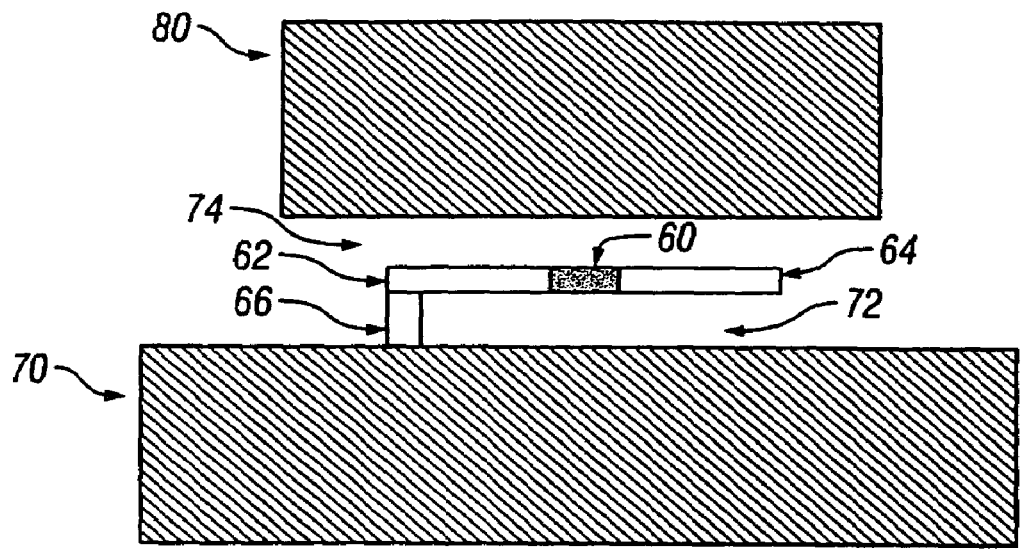
FIGS. 4a–4b show an extension to prevent a GMR device from electric-pop noise due to discharge between the GMR device and shields.

FIG. 4a is a diagram of a GMR device that is electrically shorted to a bottom shield to prevent electric-pop noise due to static discharge between the GMR device and a bottom shield.

Figure 4B:
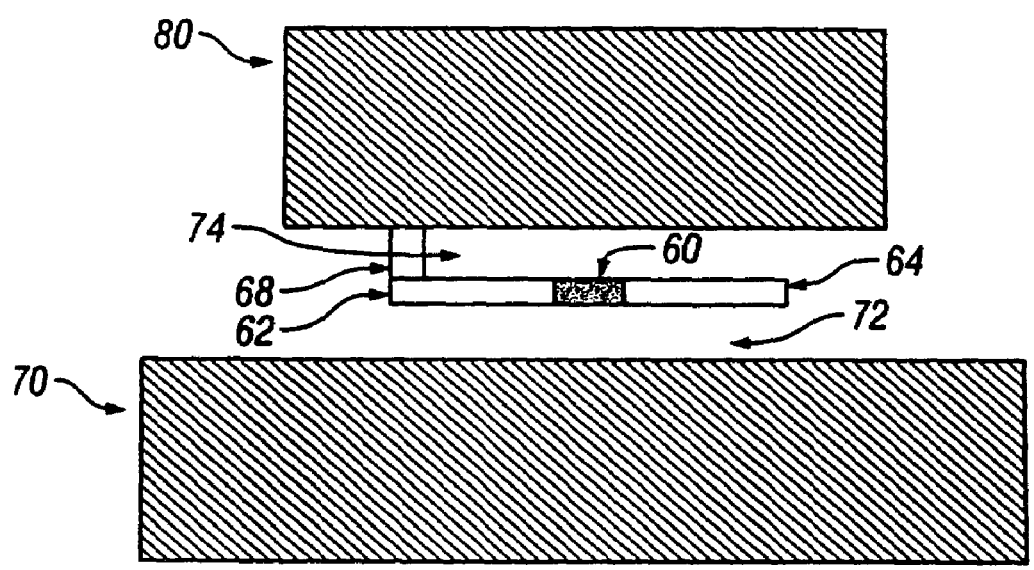

FIG. 4b is a diagram of a GMR device that is electrically shorted to a top shield to prevent electric-pop noise due to static discharge between the GMR device and a top shield.

In FIGS. 4a and 4b, reference numeral 60 designates a GMR active device, the GMR device including a spin-valve, GMR multilayer, and spin-dependent tunneling device, and numerals 62 and 64 designate stacks having a longitudinal bias layer and a lead layer, Electric contact 66 is provided between one side of lead layer and longitudinal bias layer stack 62 and the bottom shield 70. Bottom and top shields 70 and 80 are made of soft magnetic materials, such as NiFe. Gaps 72 and 74 are filled with electrically insulating materials, such as $Al_2O_3$, AlNO, AlN, and vary from 250 to 2000 Å in thickness. Electric contact 68 is provided between one side of lead layer and longitudinal bias layer stack 64 and top shield 80.

Operational principle of the present invention is explained as follows.

Signal amplitude of the AMR device is given by equation:

$$\Delta V_{pp} = MrW * J_{MR} * \frac{\Delta\rho * R_{SAL} * (\sin^2\theta - \sin^2\theta_0)}{(R_{MR} + R_{SAL})} \quad (1)$$

where:
$\Delta V_{pp}$: peak-to-peak amplitude (V),
MrW: MR read track width (μm),
$J_{MR}$: current density passing through the MR device film (A/m$^2$),
$\Delta\rho$: magnetoresistive coefficient of resistivity of the MR layer (Ω·m)

$$\frac{R_{SAL} * L_{SAL}}{R_{MR} * W_{MR} + R_{SAL} * L_{SAL}} \quad (3)$$

$R_{MR}$: sheet resistance of the MR layer (Ω),
($R_{MR}$+$R_{SAL}$): sheet resistance of the SAL layer (Ω), and
($\sin^2\theta$-$\sin^2\theta_0$): sensitivity function of the MR device.

For the same operating current I, there is a signal enhancement by a factor of square of $(R_{MR}+R_{SAL})/R_{SAL}$ comparing an AMR device without a current flowing through SAL to that with a current shunting through the SAL. In a typical AMR device, the shunt factor $R_{SAL}/(R_{MR}+R_{SAL})$ is as much as 0.7.

In the case of a SAL electrically isolated from the MR element, the SAL is electrically floating, which could result in electric-pop noise due to static discharge between the MR and SAL. In the invention illustrated in FIG. 1, we let a small percentage of current flow through the SAL. The way to achieve it is to provide electric contact to the SAL at the end of the element. With such configuration, the SAL is no longer electrically floating as there is a small amount of current flowing through the SAL. The shunting factor is determined by equation:

$$\frac{R_{SAL}}{(R_{MR} + R_{SAL})}: \text{ voltage shunting factor,}$$

where:
- $R_{SAL}$: sheet resistance of the SAL,
- $R_{MR}$: sheet resistance of the MR layer,
- $L_{SAL}$: length of the SAL, and
- $W_{MR}$: electric track width of the MR layer.

We can tune the current ratio by simply adjusting element height and length. For reference, current MR/SAL sheet resistance ratio is about 3/7. We can get 2% of current flowing through the SAL by setting width of the MR element at 20 µm assuming that our physical read track width is at 1 µm. This shunt ratio renders such a device have much higher signal than that of conventional SAL-biased AMR heads with a conducting spacer.

An alternative approach taught in FIG. 2 is to electrically connect one end of the SAL to the MR element. In this case, the SAL layer keeps the same electrical potential as that of one terminal of the AMR device and is no longer electrically floating. The advantage of this approach is to eliminate the current shunting through the SAL while preventing the SAL from electrically floating. By doing this, we can effectively eliminate charges building up in the SAL so that the electric-pop noise in the MR device is prevented.

Similar concept is used to short an SV (spin valve) GMR device to either a top or bottom shield. By doing this, we can prevent the electric-pop noise due to static discharge between the GMR device and shields. It must be pointed out that such electric-pop noise is a fundamental technology challenge for future higher density recording.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A magnetic recording head, comprising:
   a magnetoresistive layer having a first end and a second end;
   a soft adjacent magnetic transverse bias layer (SAL) having a first end and a second end;
   an insulating layer arranged between said magnetoresistive layer and said SAL;
   a conductive layer electrically contacting said first end of said magnetoresistive layer and said first end of said SAL; and
   an insulator film electrically isolating said second end of said SAL from said second end of said magnetoresistive layer.

2. The magnetic recording head of claim 1, wherein thickness of said magnetoresistive layer is more than 50 Å and less than 400 Å.

3. The magnetic recording head of claim 1, wherein thickness of said SAL is less than 500 Å, and the moment ratio of said SAL to said magnetoresistive layer ranges from 0.6 to 1.0.

4. The magnetic recording head of claim 1, wherein said insulating layer ranges from 50 Å to 200 Å in thickness.

5. The magnetic recording head of claim 4, wherein said insulating layer is formed of $Al_2O_3$.

* * * * *

UNITED STATES PATENT AND TRADEMARK OFFICE
CERTIFICATE OF CORRECTION

PATENT NO.        : 7,158,356 B2                                            Page 1 of 1
APPLICATION NO.   : 10/792078
DATED             : January 2, 2007
INVENTOR(S)       : Yong Shen et al.

It is certified that error appears in the above-identified patent and that said Letters Patent is hereby corrected as shown below:

COLUMN 3, LINE 20

Please insert        --20-- between "layer" and "varies"

COLUMN 3, LINE 42

Please insert        --ABS-- after "Numeral 60"

COLUMN 3, LINE 56

Please insert        --MR-- after "the"

COLUMN 4, LINE 40

Replace " $\dfrac{R_{SAL} * L_{SAL}}{R_{MR} * W_{MR} + R_{SAL} * L_{SAL}}$ " with -- $\dfrac{R_{SAL}}{(R_{MR} + R_{SAL})}$ : voltage shunting factor,--

COLUMN 4, LINE 65

Replace " $\dfrac{R_{SAL}}{(R_{MR} + R_{SAL})}$ : voltage shunting factor," with -- $\dfrac{R_{SAL} * L_{SAL}}{R_{MR} * W_{MR} + R_{SAL} * L_{SAL}}$ --

Signed and Sealed this

Twenty-ninth Day of July, 2008

JON W. DUDAS
*Director of the United States Patent and Trademark Office*